United States Patent
Long

[19]

[11] Patent Number: 5,837,890
[45] Date of Patent: Nov. 17, 1998

[54] JET ENGINE TEST CELL STRUCTURE

[75] Inventor: Dean F. Long, Minnetonka, Minn.

[73] Assignee: Aero Systems Engineering, Inc., St. Paul, Minn.

[21] Appl. No.: 353,701

[22] Filed: Dec. 12, 1994

[51] Int. Cl.[6] .................................................. F02K 1/06
[52] U.S. Cl. ........................... 73/116; 181/184; 181/185; 181/186; 181/198; 181/210
[58] Field of Search ................... 73/116, 117.1, 73/117.4; 181/184, 185, 186, 191, 198, 204, 210, 215, 218, 219, 227, 241

[56] References Cited

U.S. PATENT DOCUMENTS

| | | | |
|---|---|---|---|
| 3,159,238 | 12/1964 | Shearer | 181/218 |
| 3,534,831 | 10/1970 | Nagamatsu et al. | 181/215 |
| 3,587,973 | 6/1971 | Wolf et al. | 181/215 |
| 3,604,530 | 9/1971 | Duthion et al. | 181/210 |
| 3,642,092 | 2/1972 | Cederbaum | 181/204 |
| 3,710,890 | 1/1973 | True et al. | 181/215 |
| 3,715,009 | 2/1973 | Smith et al. | 181/218 |
| 3,749,316 | 7/1973 | Tontini | 181/215 |
| 3,910,375 | 10/1975 | Hache et al. | 181/215 |
| 3,927,522 | 12/1975 | Bryce et al. | 181/215 |
| 4,034,604 | 7/1977 | Decher et al. | 73/117.4 |
| 4,241,702 | 12/1980 | Takeuchi et al. | 181/204 |
| 4,385,678 | 5/1983 | Cederbaum | 181/204 |
| 4,573,551 | 3/1986 | Schwerdtner et al. | 181/218 |
| 4,747,467 | 5/1988 | Lyon et al. | 181/218 |
| 4,934,481 | 6/1990 | Friedrich | 181/215 |
| 5,377,534 | 1/1995 | Boet | 181/210 |
| 5,396,793 | 3/1995 | Colletti | 73/117.4 |

*Primary Examiner*—Elizabeth L. Dougherty
*Assistant Examiner*—Eric S. McCall
*Attorney, Agent, or Firm*—Dorsey & Whitney LLP

[57] ABSTRACT

A jet engine test cell capable of dissipating infrasound. The test cell includes an engine test section, an augmentor and an exhaust stack having a structure near its open end for dissipating infrasound.

20 Claims, 3 Drawing Sheets

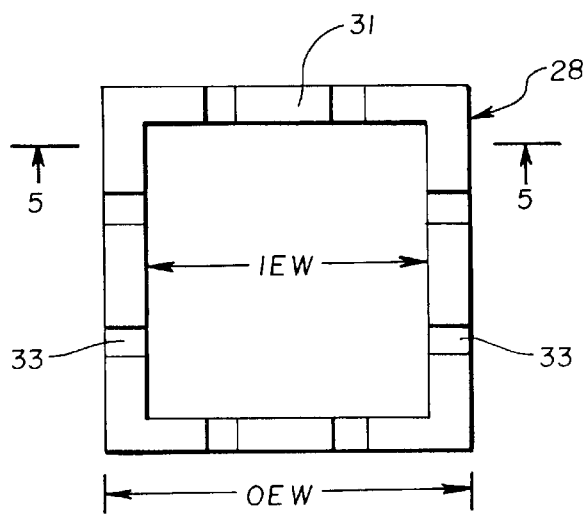
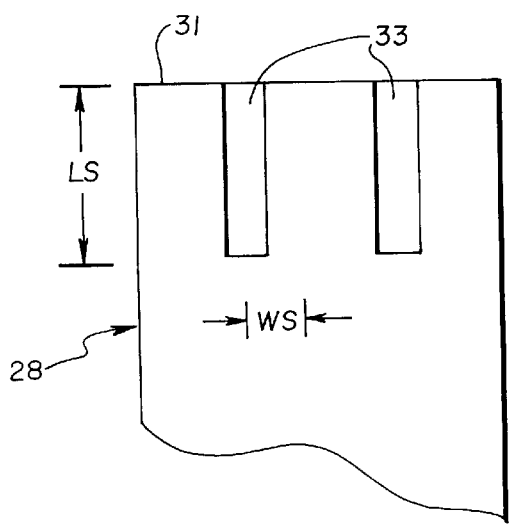
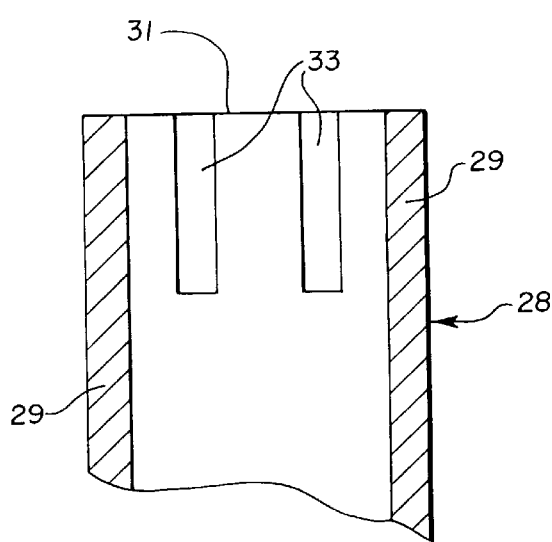

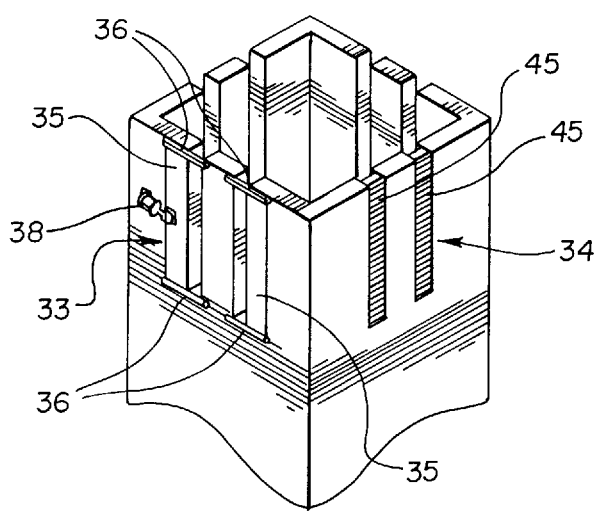
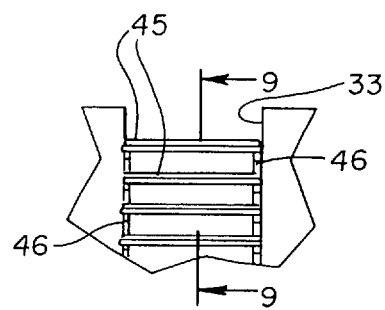
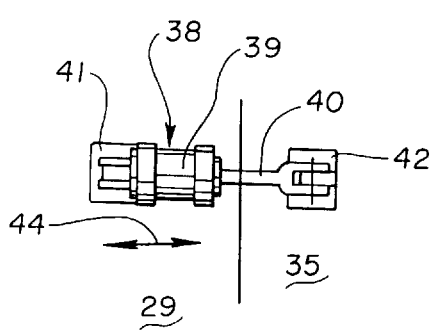
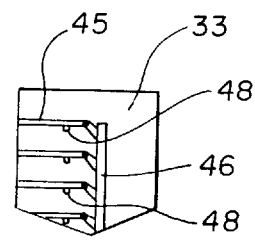
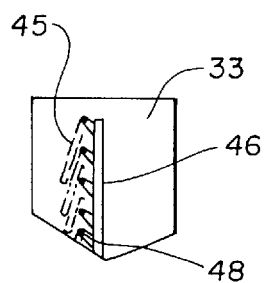

JET ENGINE TEST CELL STRUCTURE

BACKGROUND OF THE INVENTION

1. Field of the Invention

The present invention relates to a jet engine test cell and more particularly to a jet engine test cell structure having an improved exhaust stack for dissipating infrasound emanating from the test cell.

2. Description of the Prior Art

Jet engine test cells are well known in the art and are used for testing and verifying performance of newly designed or recently overhauled jet aircraft engines. Such test cells commonly include an inlet stack, a test section housing the engine to be tested, an augmentor tube and an exhaust stack. During operation, the test engine is installed in the test section and started. The engine operation draws flow into the test section through the inlet stack and exhausts flow out of the test section and into and through a large diameter tubular structure commonly referred to as an augmentor. Finally, flow is directed from the augmentor and into the base of a vertically oriented exhaust stack which exhausts the airflow into the ambient atmosphere. Test cell structures of the type described above are designed to achieve two principal purposes. First, the engine-augmentor system is designed to function as a pump to maintain sufficient air flow through the test section to provide proper aerodynamic simulation and flow rates. Secondly, the test cell is designed to minimize noise and sound waves which would otherwise radiate directly to the surrounding environment.

The problem of noise treatment for a jet engine test cell generally falls into two categories defined by two distinct regions of the sound frequency spectrum: the audible range which is generally acknowledged to extend from approximately 20 Hz through about 20 kHz and the non audible infrasound range occurring at relatively low frequencies from a few Hz to about 50 Hz. Both frequency ranges present distinct problems and concerns and thus require different solutions.

The audible part of the sound spectrum generated by the test cell corresponds to wave lengths which are small relative to the characteristic dimensions of the test cell and results principally from sound waves propagating from the test engine, through the system and out into the environment. The accepted solutions for dealing with sound waves in the audible frequencies are straight forward and commonly involve the use of acoustic baffles at the inlet end of the test cell as well as in the exhaust stack. It has been found that such baffles are able to dissipate sound waves in the audible frequency range to an acceptably low level.

Infrasound, however, occurs at wave lengths that are large relative to the characteristic dimensions of the test cell and thus result in what are considered standing wave patterns rather than propagating noise. Although infrasound is not audible, and thus does not present readily detectable concerns to the surrounding population, the relatively large wave lengths of infrasound present its own unique set of problems and concerns. For example, large buildings and other structures or parts thereof will vibrate or tend to vibrate at certain natural frequencies in the infrasound range. The concern is that repeated exposure to infrasound frequencies over an extended period of time could result in structural problems. The concern exists not only with respect to buildings and other structures in existence at the time the test cell is installed, but buildings and other structures which may be erected years later as the community and surrounding businesses develop.

A dominate source of low frequency, infrasound noise originates from the fundamental resonance modes of the exhaust stack. During operation of the test cell, turbulent energy and air flow is supplied to the base of the stack from the augmentor tube. This turbulent energy is converted to noise at infrasound wave lengths through a resonant process. Since the exhaust stack is closed at the bottom and open at the top, these resonance modes or frequencies (f) take the form:

$$f = a_o \frac{2n+1}{4L}$$

where n=0, 1, 2 . . . , $a_0$ is the speed of sound and L is the height of the stack. This is the classic form of an organ pipe resonance where the modes produce velocity fluctuations at the stack exit that radiate as a sound source. According to the above equation, the frequency of the sound source is inversely proportional to the stack height. Thus, higher stack heights lead to lower frequencies, while lower stack heights lead to higher frequencies.

Because of the relatively large wave lengths of infrasound, standard methods such as the provision of acoustical baffles for treating audible noise are inappropriate. Various solutions to the infrasound problem, however, have been employed. One involves providing a mixing device installed at the entrance to the augmentor tube. Such a device is commonly referred to as a ring diffuser, a mixer or a Koppers harp. With such device, the naturally occurring, large scale structures within the mixing zone are prevented, thus resulting in the creation of smaller scale turbulence. This lack of large scale turbulence reduces the level of low frequency infrasound. Unfortunately, the high speed exhaust flow places severe stresses on the mixing device, thereby leading to a high vibration level and increased mechanical failure unless repairs are made on a continuous basis. These repairs are time consuming and reduce the productivity of the test cell facility. Further, the provision of such a device has the negative effect of tending to alter the aerodynamics of the system and in particular the augmentor tube.

Another proposed solution employs an augmentor tube which is provided with a telescoping section to alter its length. This variable length provides two effects. First, it changes the overall length of the augmentor which in turn alters the resonate noise characteristics of the tube and secondly, it allows the flow field to be contained immediately downstream of the test engine. Such effects control the development of turbulence enough so as to decrease low frequency infrasound. However, the telescoping augmentor section tends to be quite expensive and, similar to the use of a mixer as described above, tends to affect the aerodynamics of the system. Thus, use of such a telescoping augmentor tube may invalidate the test results if not properly positioned for each type of engine.

Accordingly, there is a need in the art for an improved jet engine test cell capable of improved noise control and more particularly for a jet engine test cell capable of improved infrasound reduction and control without altering the aerodynamics of the test cell.

SUMMARY OF THE INVENTION

In contrast to the prior art, the present invention relates to a jet engine test cell and more particularly, an exhaust stack for a test cell which functions to reduce the generation of, and to dissipate, infrasound within the test cell system.

In accordance with the present invention, a jet engine test cell is provided which includes an air inlet stack, a jet engine test section adapted to receive a jet engine for testing, an augmentor connected with the test section and a vertically oriented exhaust stack connected with the exhaust end of the augmentor tube. The exhaust stack in accordance with the present invention includes a generally tubular configuration with a closed bottom end and an open top end. The top end is provided with means designed to eliminate or substantially reduce stack resonances which typically form within the stack. During operation of the test cell of the present invention, the large scale turbulence created by the engine is allowed to flow through the augmentor tube and exit into the exhaust stack. In prior systems, as discussed above, this large scale turbulence is converted to sound waves in the infrasound range through a resonant process similar to that of an organ pipe.

The solution in accordance with the present invention is to make the exhaust stack height a diffuse quantity by providing an open area near its top or open end. In the preferred embodiment, this open area is defined by a plurality of open slots extending downwardly from the top end of the exhaust stack. If these slots or openings are large enough relative to the upper end of the exhaust stack, the stack will behave as though the height of the stack conforms to the lower end of the slot or openings. If the slot width or openings are small relative to the top end of the stack, the stack will behave as though the stack height is the full height of the stack. At intermediate slot widths and openings, the effective stack height is diffuse and has no clear exit point. In such case, the height or length of the stack (L) in the above equation is a variable quantity. Thus, organ pipe type resonances are less likely to occur because a clear single frequency cannot be established. Without such resonances, the noise radiation, and in particular the infrasound radiation, decreases dramatically.

A further feature of the preferred embodiment of the present invention is the provision of means by which the slot widths or open areas can be adjusted. With such adjustment means, the slot width or open area can be adjusted to maximize the resonance diffusion, and thus minimize infrasound generation, for a particular jet engine or for particular jet engine characteristics.

Accordingly, it is an object of the present invention to provide a jet engine test cell having improved infrasound noise reduction capability.

Another object of the present invention is to provide a jet engine test cell having improved infrasound reduction capability without altering the aerodynamics of the test cell.

A further object of the present invention is to provide a jet engine test cell having an exhaust stack with means for diffusing the effective height of such stack.

A still further object of the present invention is to provide an exhaust stack for a jet engine test cell provided with means near its open end for diffusing the effective height of such stack to thus reduce the formation of infrasound.

A still further object of the present invention is to provide an exhaust stack for a jet engine test cell with variable openings near the top end of the stack to diffuse the effect of height thereof.

These other objects of the present invention will become apparent with reference to the drawings, the description of the preferred embodiment and the appended claims.

DESCRIPTION OF THE DRAWINGS

FIG. 3 is a top elevational view of the open end of the exhaust stack in accordance with the present invention.

FIG. 4 is an elevational side view of the open end section of the exhaust stack in accordance with the present invention.

FIG. 5 is a sectional view as viewed along the section line 5—5 of FIG. 3.

FIG. 6 is an isometric view of the exhaust stack of the present invention embodying two alternate means for varying the slot width.

FIG. 7 is an enlarged fragmentary view showing the cylinder and piston mechanism for actuating one of the alternate means for varying the slot width.

FIG. 8 is an elevational front view of an alternate means for varying the slot width.

FIGS. 9A and 9B are sectional views as viewed along the section line 9—9 of FIG. 8, with FIG. 9A showing the louvers in an open position and FIG. 9B showing the louvers in a closed position.

DESCRIPTION OF THE PREFERRED EMBODIMENT

Figure 1:
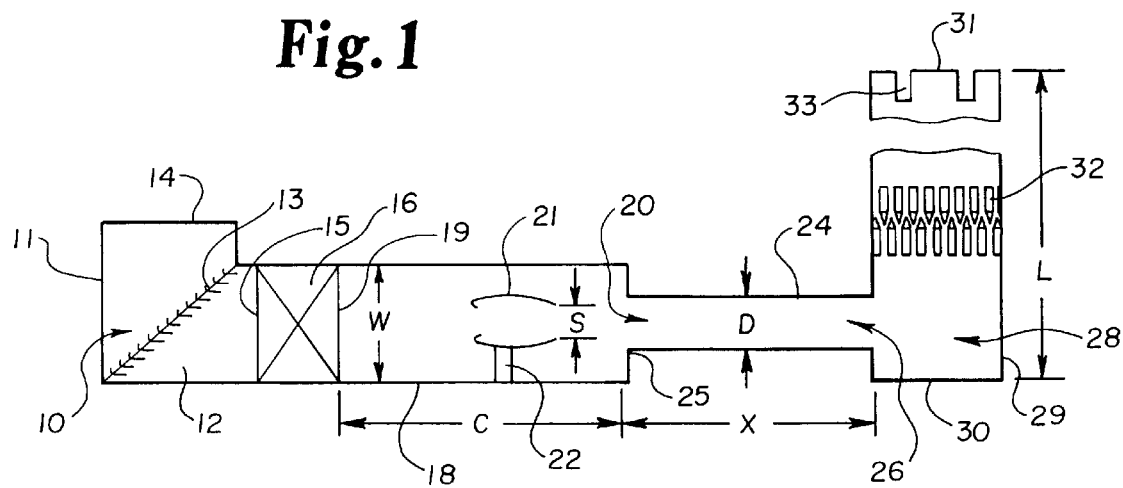
FIG. 1 is a side elevational schematic view of a jet engine test cell illustrating the main functional components of the test cell and incorporating the improved exhaust stack structure in accordance with the present invention.

Reference is first made to FIG. 1 representing a side elevational, schematic view of a jet engine test cell illustrating the various functional components of such a test cell and incorporating the improved exhaust stack in accordance with the present invention.

The test cell of FIG. 1 includes an air inlet stack 10 comprised of a vertical inlet stack portion 11 and a horizontal inlet stack portion 12. The vertical stack section 11 includes an open top 14 open to the ambient environment and is connected with the horizontal inlet stack section 12 at the junction 13. The horizontal section 12 includes one or more sets of inlet acoustic baffles 16 having an inlet end 15 and an exhaust end 19. Such baffles function to limit or reduce the audible sound emanating from the test cell. The detailed structure of such acoustic baffles and their use in jet engine test cells are well known in the art.

The exhaust end 19 of the horizontal section 12 and the baffles 16 leads into a jet engine test section 18. The test section 18 is horizontally disposed and comprises a large, tubular section adapted to receive a jet engine 21 for testing. The test section 18 has dimensions defined by the a section height W and a test section length C and further includes an inlet end connected with the horizontal section 12 and an exhaust end 20 leading into the inlet end of an augmentor or augmentor tube 24. As shown, an engine 21 includes an engine exhaust diameter S and is mounted within the test section 18 on an engine mount 22.

The augmentor 24 is provided immediately downstream from the test section 18 and receives exhaust air flow from the test section 18 and directs it to the exhaust stack 28. The augmentor 24 is a tubular member defined by an augmentor diameter D and an augmentor length X. The augmentor 24 can be provided with various devices, if desired, for altering the turbulence of flow within the augmentor 24 such as the provision of a ring diffuser, mixer or Koppers harp illustrated schematically by the reference character 25.

Figure 2:
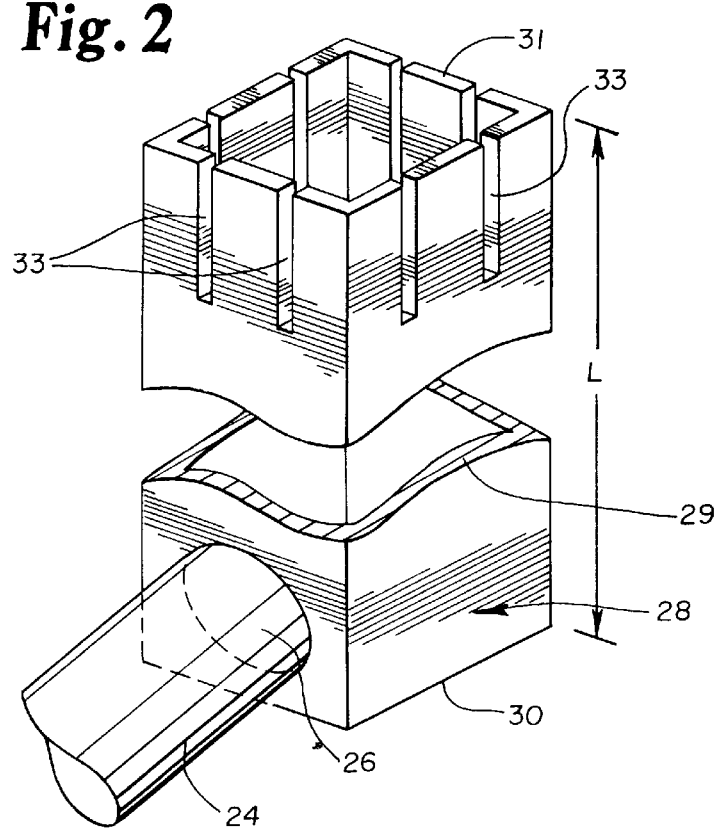
FIG. 2 is an isometric view of the exhaust stack of a jet engine test cell in accordance with the present invention, with portions broken away.

The exhaust end 26 of the augmentor 24 communicates with an opening in the exhaust stack 28 for directing the exhaust from the test engine 21 into the exhaust stack 28. As illustrated generally in FIGS. 1 and 2, the exhaust stack 28 is a generally tubular, vertically oriented structure defined by an exhaust stack wall 29 and having a closed bottom end 30 and an open top end 31. A lower end of the exhaust stack 28 includes an opening for communication with the exhaust end 26 of the augmentor 24. Preferably the exhaust stack 28 is provided with one or more sets of exhaust acoustic baffles 32 positioned within the exhaust stack 28 to limit and reduce audible noise from the test cell. Such acoustic baffles 32 may be similar, if not identical to the inlet acoustic baffles 16. Such baffles are well known and are available in the art.

As illustrated best in FIGS. 2, 3, 4 and 5, the top portion of the exhaust stack 28 is provided with a plurality of open areas in the form of a plurality of elongated slots 33. In the preferred embodiment, the slots 33 are vertically oriented and extend from the top, open end 31 downwardly toward the closed bottom end. In the embodiment illustrated, a pair of slots 33 are provided at the top ends of each of the wall sections. The slots 33 function to diffuse the effective height L of the exhaust stack 28.

The length LS of the slots 33 defines the two end extremes of the effective height L of the exhaust stack 28. The width WS of the slots 33 relative to the cross sectional size of the exhaust stack 28 defines the level of diffusion of resonance formation provided by the slots 33. The particular length and width of the slots 33 necessary to maximize the resonance diffusion, and thus minimize the formation of infrasound, will vary from engine to engine. However, preferably, the length LS of the slots 33 should be at least about 33% of the stack width. The specific dimension, however, will vary with the size of the cell in question. The cumulative width of the slots 33 preferably comprises at least about 2%, but no more than about 15%, of the internal circumference of the exhaust stack. Further, the slot length LS should preferably be about 10–50% of the stack height L and most preferably about 20%.

Although the preferred embodiment shows the open areas at the top of the exhaust stack 28 to comprise vertically oriented elongated rectangular slots 33, it is contemplated that other shapes and configurations of open areas can be utilized as well. For example, slots with inclined edges or open areas comprised of a plurality of apertures can be used.

Although the advantages of the present invention can be achieved with a structure such as that illustrated in FIGS. 1–5 in which the open areas or slots at the top of the exhaust stack are fixed, greater flexibility can be achieved by providing the open areas with adjustment means for varying the open area or slot size. For example, FIG. 6 illustrates the top end of an exhaust stack embodying alternate means 33 and 34 for adjusting the effective open area of the slots.

The means 33 includes a plurality of sliding panels or gates 35—35 which are mounted in top and bottom tracks 36 for sliding movement laterally relative to the length of the slots 33. As shown in the embodiment of FIG. 6, a piston/cylinder mechanism 38 is associated with each of the sliding doors 35, 35 for selectively sliding the doors between a fully opened position in which the entire slot is exposed, a fully closed position in which the entire slot is covered and a plurality of positions where the slot is partially closed.

The fragmentary view of FIG. 7 shows the piston/cylinder means in greater detail. Specifically, the piston/cylinder means 38 includes a hydraulic or pneumatic cylinder 39 housing a piston (not shown). A piston rod 40 extends from the piston and is connected to one of the sliding doors 35 through the mounting bracket 42. The piston/cylinder is mounted to the wall 29 of the exhaust stack. By appropriately actuating the cylinder 39 the door 35 is selectively moved in a lateral direction defined by the directional arrow 44.

The adjustment means 34 of FIG. 6 comprises a plurality of louvers 45 positioned in the slots. As illustrated best in FIG. 8, the means 34 includes a plurality of louvers 45 extending across the width of the slot, with actuating rods 46, 46 positioned on opposite sides. As shown in FIGS. 9A and 9B, the louvers 45 are pivotable about a plurality of pivot points 48 by appropriate movement of the rod 46. FIG. 9A shows the louvers 45 in an open position, while FIG. 9B shows the louvers 45 in a closed position.

By varying the effective size of the openings or slots via the means 33 and 34 described above, the slots size can be adjusted to provide the most efficient slot width for a particular size of cell structure or a particular size or type of jet engine. It is intended that the means 33 and 34 illustrated are only two of many possible other means that could be utilized to vary the effective size of the slots 33.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

I claim:

1. An infrasound reducing exhaust stack for an engine test cell comprising;

a closed end;

an open end;

a tubular exhaust stack wall extending between said closed and open ends and defining an elongated exhaust stack chamber having a direction of elongation, a stack height measured in the said direction of elongation and a stack width measured in a direction perpendicular to said stack height;

an exhaust inlet in said exhaust stack wall for receiving exhaust from said test cell; and said exhaust stack wall provided with an open area near said open end for dissipating infrasound within said exhaust stack, said open area formed by at least one opening in said stack wall, said at least one opening having a length measured in the direction of elongation of said exhaust stack chamber wherein the length of said opening is at least 33% of said stack width whereby said open area and its defined length relative to said stack width functions to reduce the formation of infrasound.

2. The exhaust stack of claim 1, wherein said open area is formed by a plurality of openings in said exhaust stack wall.

3. The exhaust stack of claim 2 wherein said open area is adjustable.

4. The exhaust stack of claim 3 including means for adjusting said open area.

5. The exhaust stack of claim 2 wherein said plurality of openings comprises a plurality of slots in said exhaust stack wall, said slots being open to said open top and extending toward said closed end.

6. The exhaust stack of claim 5 wherein said exhaust stack chamber has a circumference defined by the distance around said stack chamber in a plane perpendicular to said direction of elongation, wherein each of said slots has a width measured in a direction perpendicular to the length of said slot and along said stack chamber circumference, wherein said exhaust stack has a cumulative slot width defined by the summation of the widths of all of said slots and wherein said cumulative slot width comprises at least 2%, but not more than 15% of the circumference of the stack chamber.

7. The exhaust stack of claim 5 wherein the length of said slots is 10–50% of the height of the stack.

8. A jet engine test cell comprising, in combination:

a jet engine test section adapted to receive a jet engine for testing, said test section having a test section inlet end and a test section exhaust end;

an augmentor having an augmentor inlet end connected with said test section exhaust end and an augmentor exhaust end; and an exhaust stack in accordance with claim 13 connected with said augmentor exhaust end.

9. The jet engine test cell of claim 8 wherein said exhaust stack is vertically oriented.

10. The jet engine test cell of claim 9 wherein said open area for dissipating infrasound includes a plurality of openings near said open end and extending through said exhaust stack wall.

11. The jet engine test cell of claim 10 wherein said plurality of openings comprises a plurality of open slots extending from said open end toward said bottom end.

12. The jet engine test cell structure of claim 10 wherein each of said openings has a size and wherein the size of said openings is variable.

13. The jet engine test cell structure of claim 12 including means for varying the size of said openings.

14. The jet engine test cell structure of claim 10 wherein said exhaust stack chamber has a circumference defined by the distance around said stack chamber in a plane perpendicular to said direction of elongation, wherein each of said openings has a width measured in a direction perpendicular to the length of said opening and along said stack chamber circumference and wherein the sum of the widths of said openings comprises at least 2%, but no more than 15%, of the circumference of the stack chamber.

15. The jet engine test structure of claim 11 wherein said exhaust stack chamber has a circumference defined by the distance around said stack chamber in a plane perpendicular to said direction of elongation, wherein each of said slots has a width measured in a direction perpendicular to the length of said slot and along said stack chamber circumference, wherein said exhaust stack has a cumulative slot width defined by the summation of the widths of all of said slots and wherein said cumulative slot width comprises at least 2%, but not more than 15% of the circumference of the stack chamber.

16. The jet engine test structure of claim 11 wherein the length of said slots is 10–50% of the height of the stack chamber.

17. The jet engine test cell structure of claim 15 wherein said open area is adjustable.

18. The jet engine test cell structure of claim 17 including means for adjusting said open area.

19. The exhaust stack of claim 1 wherein said at least one opening is continuous throughout its length.

20. An infrasound reducing exhaust stack for an engine test cell comprising:

a closed end;

an open end;

a tubular exhaust stack wall extending between said closed and open ends and defining an elongated exhaust stack chamber having a direction of elongation, a stack height measured in said direction of elongation and a stack width measured in a direction perpendicular to said stack height;

an exhaust inlet in said exhaust stack wall for receiving exhaust from said test cell;

said exhaust stack wall provided with an open area near said open end for dissipating infrasound within said exhaust stack, said open area formed by at least one opening in said stack wall, said opening having a variable size; and means for varying the size of said opening to a size relative to said stack width whereby said opening functions to reduce the formation of infrasound.

* * * * *